Jan. 17, 1950          J. H. BOOTH          2,494,738
STEERING GEAR
Filed March 26, 1947          6 Sheets-Sheet 3
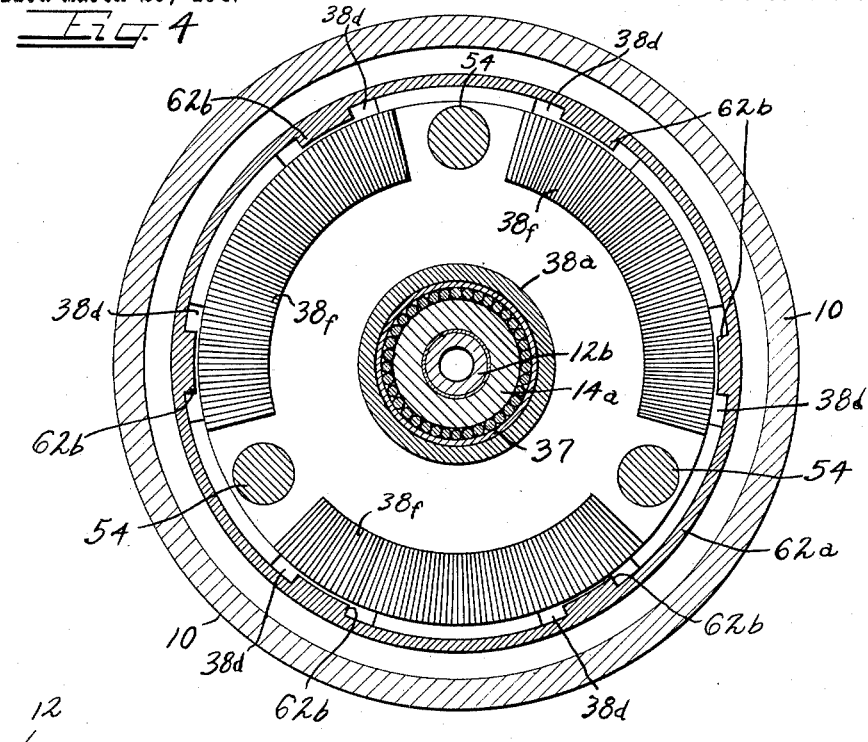
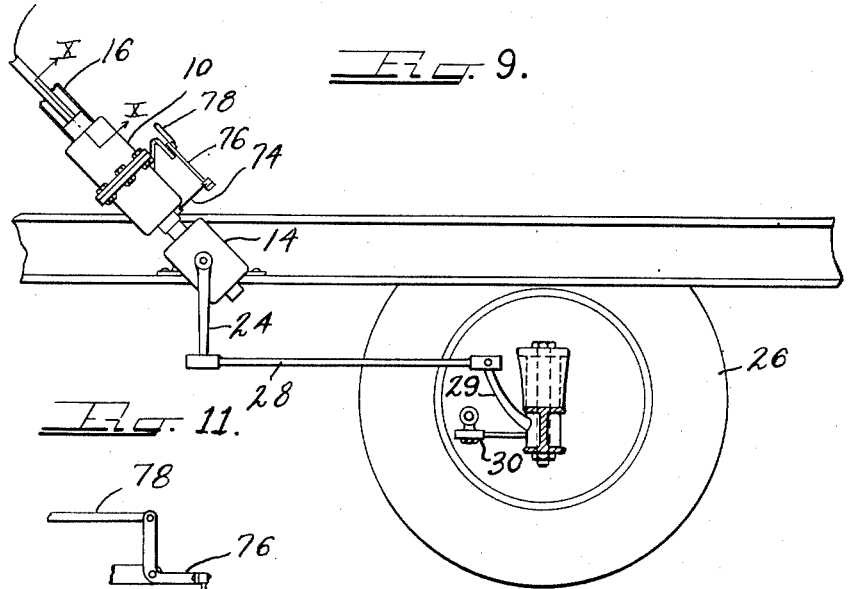
Inventor
JAMES H. BOOTH Jan. 17, 1950  J. H. BOOTH  2,494,738
STEERING GEAR Filed March 26, 1947  6 Sheets-Sheet 4

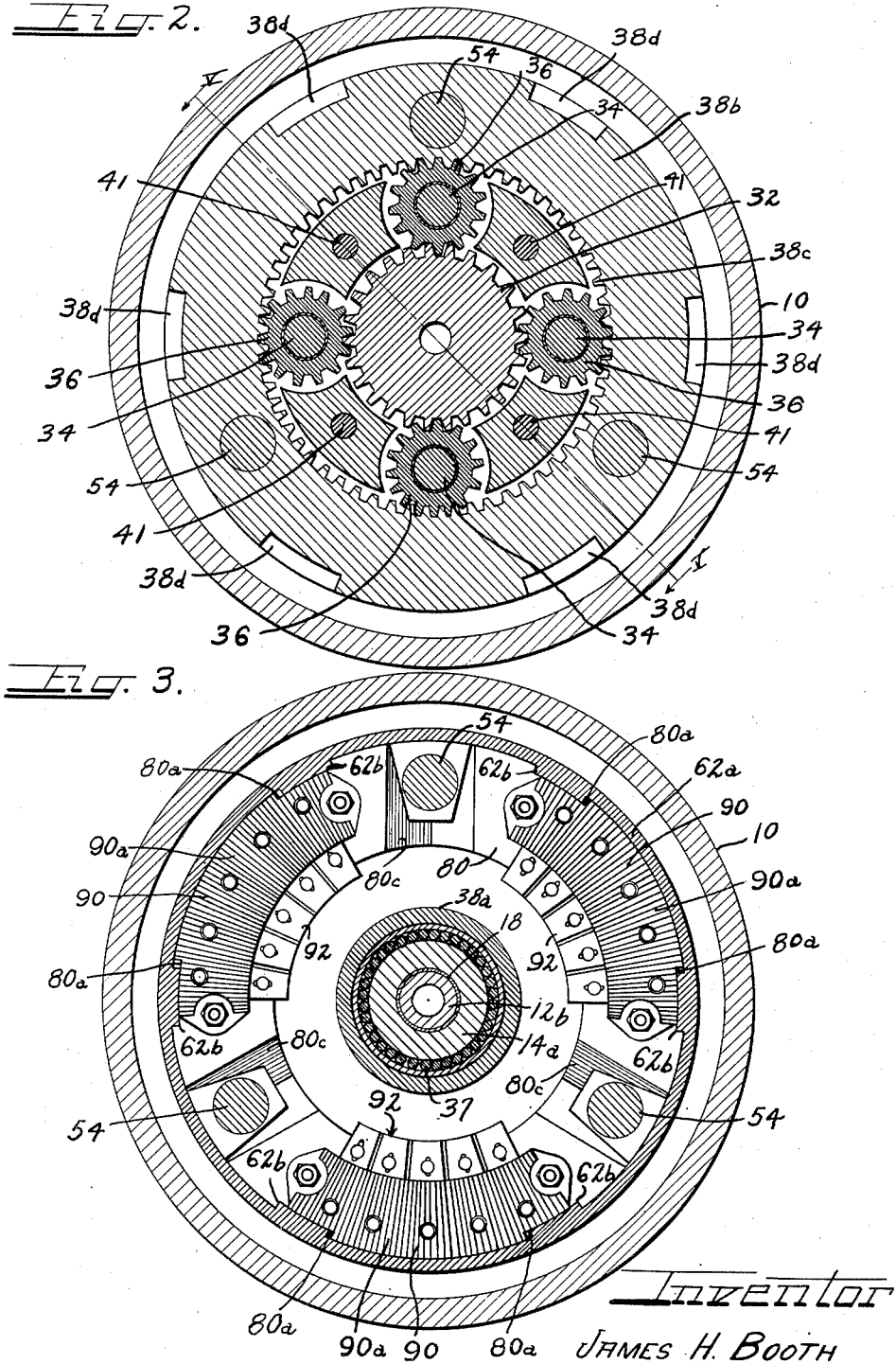

Inventor
JAMES H. BOOTH

By The firm of Charles H. Hill
Attys.

Jan. 17, 1950 J. H. BOOTH 2,494,738
STEERING GEAR
Filed March 26, 1947 6 Sheets-Sheet 5
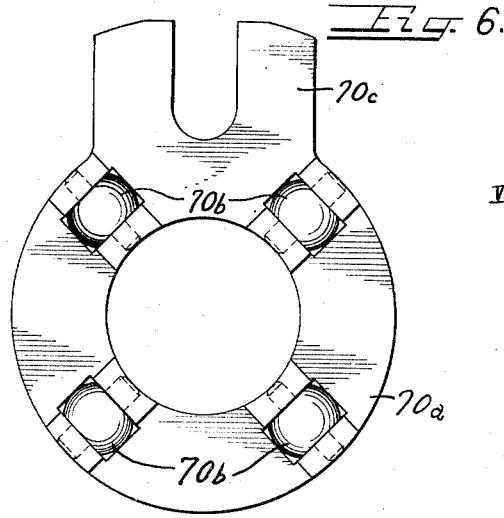
Fig. 6.
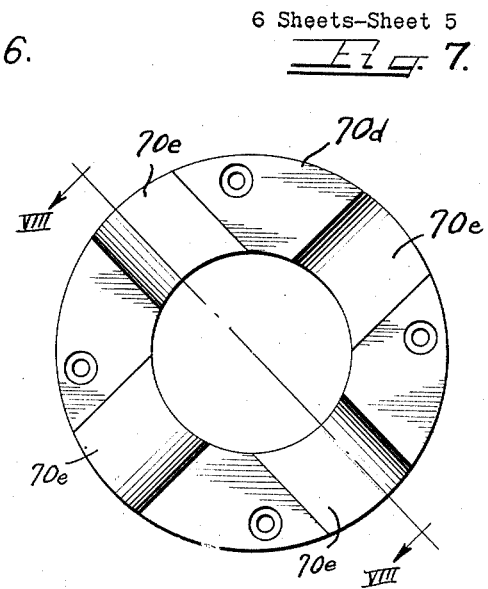
Fig. 7.
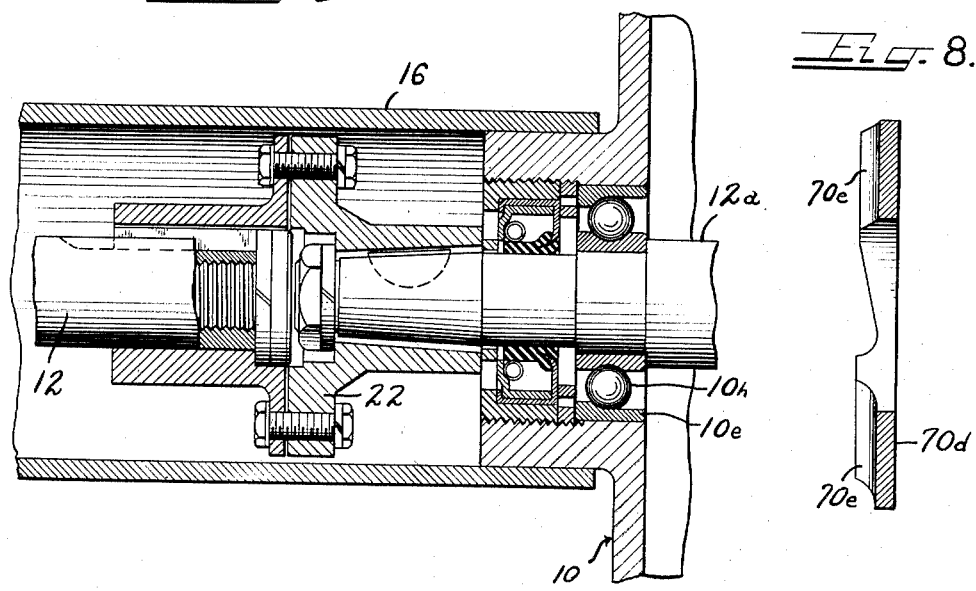
Fig. 10.
Fig. 8.
Inventor
JAMES H. BOOTH
by The Firm of Charles H. Lillis
Attys.

Jan. 17, 1950 J. H. BOOTH 2,494,738
STEERING GEAR
Filed March 26, 1947 6 Sheets-Sheet 6

Fig. 14.

Inventor
JAMES H. BOOTH
By
Attys.

Patented Jan. 17, 1950

2,494,738

UNITED STATES PATENT OFFICE 2,494,738

STEERING GEAR

James H. Booth, Detroit, Mich., assignor to Thompson Products, Inc., Cleveland, Ohio, a corporation of Ohio Application March 26, 1947, Serial No. 737,265

15 Claims. (Cl. 74—785)

This invention relates to a variable gear ratio drive for steering assemblages of dirigible vehicles.

There has been a long recognized need in the automotive industry in general, and in the heavy truck industry in particular, for a steering mechanism which would permit the selective adjustment of the effective gear ratio between the steering wheel and the dirigible wheels of the vehicle. Constructions heretofore known and utilized have not been satisfactory either from the standpoint of safety, in that they did not provide at all times and under all conditions a positive driving connection between the steering wheel and the dirigible road wheels of the vehicle, or that such known devices were complicated, expensive to manufacture, were large and cumbersome in overall dimensions and weight, and could not be readily applied to existing vehicles without necessitating a complete rebuilding of the entire steering mechanism.

A feature of this invention is the provision of a variable gear ratio device readily insertable in the steering linkage of a dirigible vehicle which is of rugged construction, completely dependable in operation, and particularly, which will provide a positive driving connection between the steering wheel of the vehicle and its dirigible road wheels in any of the selected gear ratio conditions, as well as during the shifting operation involved in changing from one gear ratio condition to another selected condition.

A further feature of this invention is the provision of a variable gear ratio mechanism for vehicle steering systems which may be inserted between the steering shaft and the steering gear box of conventional steering systems and is of such extremely compact construction that it may be completely included in a moderate size housing forming a concentric enlargement of the housing generally provided for the steering shaft.

In accordance with this invention, the variable gear ratio mechanism is completely housed within a cylindrical housing which surrounds both the end of the steering shaft and the end of an input shaft member for the steering gear box of a conventional steering linkage. Such shafts are coaxially arranged and are interconnected by a planetary transmission which is concentrically disposed about the common shaft axis. A clutch and an axially spaced brake are provided which are also concentrically disposed about the shaft. The clutch normally effects a direct drive connection between the steering shaft and the gear box input shaft. The brake is selectively operable to effect the connection of the ring gear of the planetary transmission to the stationary housing. The resulting braking action on the ring gear by the movement of the brake to its engaged position is utilized to produce a displacement of the shiftable control member for the clutch which effects the disengagement of the clutch and thus permits the steering shaft to drive the gear box input shaft at a reduced gear ratio through the elements of the planetary transmission.

Accordingly, it is an object of this invention to provide an improved variable gear ratio steering assembly.

Another object of this invention is to provide a steering mechanism with a planetary gear transmission controllable under the will of the operator to provide any one of a plurality of effective gear reduction ratios between the steering column and the steering linkage.

A further object of this invention is to provide a variable gear ratio steering assembly for automotive vehicles characterized by the maintenance of a positive driving connection between the steering column and steering linkage in any of the selectable gear ratio conditions and during shifting operations between selected gear ratio conditions.

A particular object of this invention is to provide a variable gear ratio steering assembly of compact, yet rugged construction which may be readily inserted between the steering column and steering gear box of existing vehicles and which may be conveniently housed in a slightly enlarged housing element formed substantially as a concentric continuation of the conventional housing of the steering column.

A still further object of this invention is to provide an improved automotive vehicle steering mechanism having a planetary transmission which is controllable by the selective operation of a clutch and a brake to produce either a high or low effective gear ratio between the steering shaft and steering linkage of the vehicle.

The specific nature of the invention as well as other objects and advantages thereof will be apparent to those skilled in the art from the following detail description of the annexed sheets of drawings, which, by way of preferred example only, illustrate one embodiment of the invention.

On the drawings:

Figure 2 is a transverse sectional view taken along the plane II—II of Fig. 1.

Figure 3 is a transverse sectional view taken along the plane III—III of Fig. 1.

Figure 4 is a transverse sectional view taken along the plane IV—IV of Fig. 1.

Figure 6 is an end elevational view of the ball carrying plate of the shifting mechanism utilized in the assembly of Fig. 1.

Figure 7 is an end elevational view of the cam plate which cooperates with the ball carrying plate of Fig. 6.

Figure 8 is a transverse sectional view taken along the plane VIII—VIII of Fig. 7.

Figure 9 is a diagrammatic view illustrating the assemblage of the variable gear ratio mechanism in the conventional steering linkage of an automotive vehicle.

Figure 10 is an enlarged scale, partial sectional view taken along the plane X—X of Fig. 9.

Figure 11 is a partial elevational view illustrating the connection of the control cable to the manually operable control lever.

Figure 14 is a view similar to Fig. 1 but showing the elements of the steering assembly in the positions occupied for low gear ratio steering.

As shown on the drawings:

Figure 1:
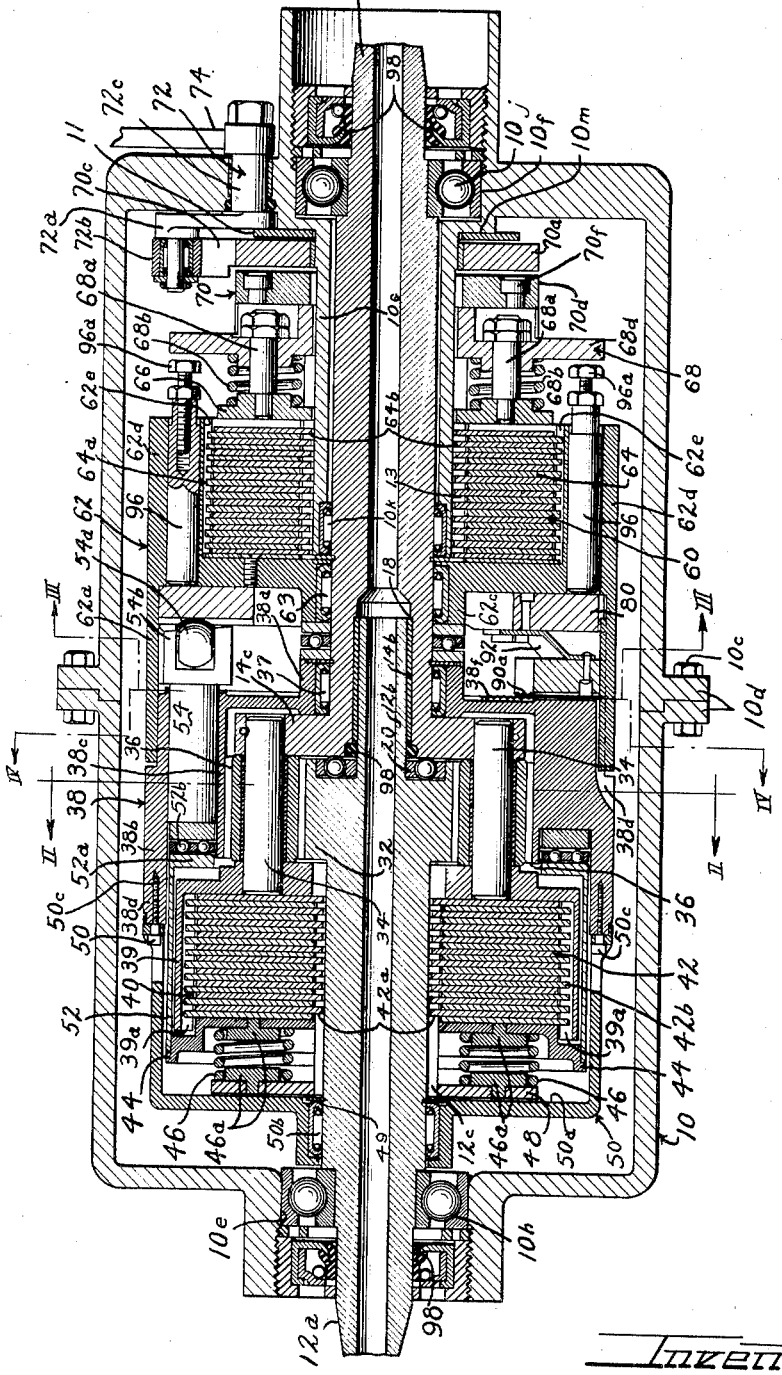
Figure 1 is a sectional view taken along a diametral plane of a variable gear ratio steering assembly embodying this invention, showing the elements thereof in their positions for high gear ratio steering.

Referring to Figs. 1 and 14, it should be noted that all of the essential elements of a variable gear ratio steering assembly embodying this invention may be conveniently housed within a generally cylindrically housing 10. As best shown in Fig. 9, the housing 10 may be conveniently inserted between the lower end of the conventional steering column shaft 12 and the upper end of a conventional steering gear box 14. In such position, the housing 10 effectively constitutes an enlarged continuation of the tubular housing 16 which is conventionally provided in surrounding relationship to the steering column shaft 12.

The housing 10 may be conveniently formed by assembly of two half portions 10a and 10b which are joinable upon a plane perpendicular to their axis and secured together by suitable bolts 10c passing through integral flange portions 10d formed at their mating surfaces.

Each of the housing half portions are of generally cup-shaped configuration and have central openings 10e and 10f, respectively, in their base portions. Housing half 10b has an axially inwardly extending annular hub portion 10g. A steering shaft 12a is mounted in housing 10 and has one end portion thereof journaled in a suitable bearing 10h provided in housing aperture 10e. A gear box input shaft 14a extends into the other end of housing 10, having its outer end journaled in a suitable bearing 10j provided in housing aperture 10f and its inner end journaled in bearing 10k mounted in hub 10g. The inner ends of shafts 12a and 14a provide mutual support for each other by being telescoped together. In the particular arrangement illustrated, a reduced diameter end portion 12b of steering shaft 12a projects into a counterbore 14b provided in the inner end of shaft 14a. A sleeve bearing 18 is mounted between the telescoped shaft portions while a ball type thrust bearing 20 is disposed between the end faces of the coaxially mounted shafts 12a and 14a.

As best shown in Fig. 10, the end portion of steering shaft 12a which projects out of housing 10 is rigidly secured to steering column shaft 12 by a suitable coupling 22. The projecting end of gear box input shaft 14a is, of course, connected to the mechanism within gear box 14 in conventional manner. As will be recognized by those skilled in the art, gear box 14 includes suitable reduction gears which translate the rotation of input shaft 14a into a pivotal movement of a pitman arm 24. Pitman arm 24 is connected by any desired form of conventional steering linkage to a dirigible road wheel 26 of the particular automotive vehicle, such as through drag link 28 and steering arm 29. Tie rod bracket 30 and a suitable tie rod (not shown) are of course provided to produce concurrent steering movement of the opposed vehicle wheel (not shown).

Figure 5:
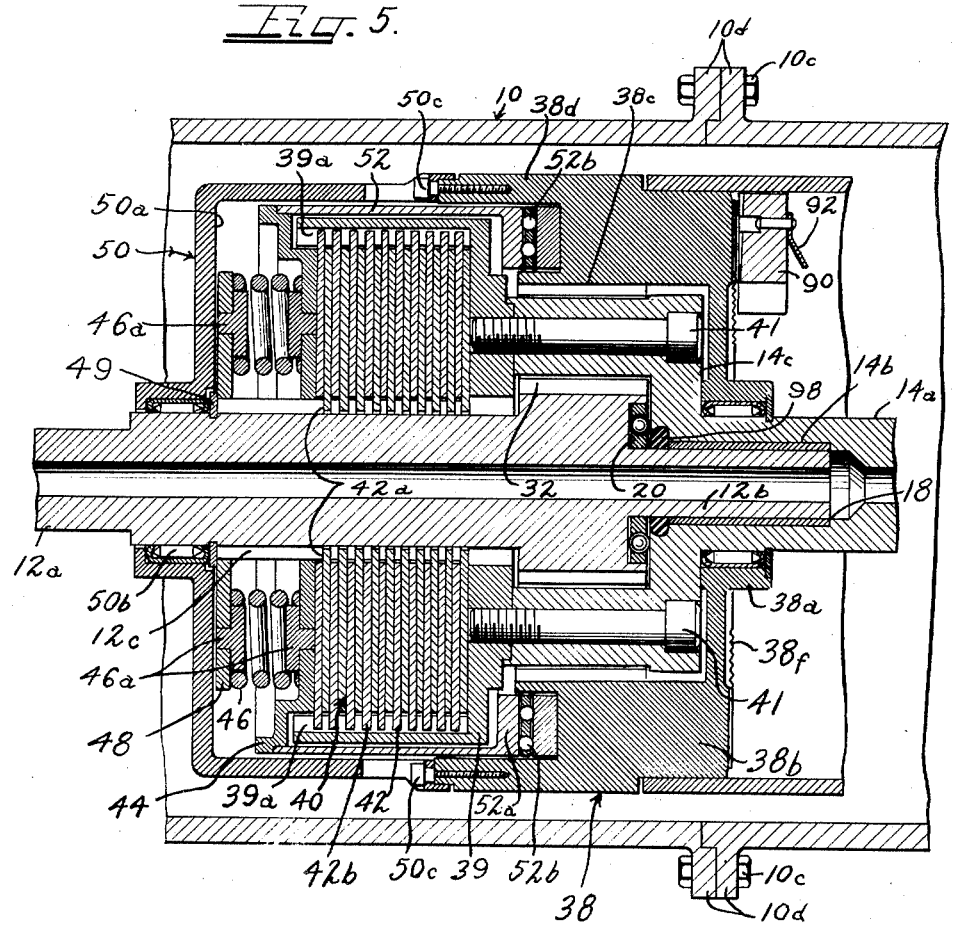
Figure 5 is a partial longitudinal sectional view taken along the plane V—V of Fig. 2.

Adjacent the innermost end of steering shaft 12a, a sun gear 32 is integrally formed on such shaft. The innermost end of gear box input shaft 14a is provided with an enlarged integral spider portion 14c which supports a plurality of circumferentially spaced shafts 34, each of which carries a planet gear 36 meshing with sun gear 32. An annular, generally cup shaped clutch housing 39 is mounted in surrounding relationship to shaft 12a with the base portion thereof immediately adjacent sun gear 32 and provided with suitable circumferentially spaced apertures to journal the other ends of planet gear shafts 34. As best shown in Fig. 5, clutch housing 39 is rigidly secured to spider portion 14c by a plurality of circumferentially spaced bolts 41 which are located intermediate the positions of planet gear shafts 34. A ring gear housing 38 is provided which is of annular configuration, having a small diameter hub portion 38a which is rotatably journaled on the exterior of shaft 14a by a bearing 37. A large diameter annular portion 38b of housing 38 has walls of substantial thickness. On the inner peripheral surface of such walls, gear teeth 38c are provided which surround and mesh with the planet gears 36. Hence a planetary gear transmission system is formed between steering shaft 12a and gear box input shaft 14a wherein the steering shaft is connected to the sun gear of the planetary system and the input gear box shaft is connected to the spider of the planet gears of the system.

As will be recognized by those skilled in the art, such planetary transmission readily permits the attainment of a plurality of effective gear ratios between the steering shaft and the gear box input shaft. In accordance with this invention, two such gear ratios are provided. In the low gear ratio condition, the gear box input shaft 14a is effectively directly coupled to a steering shaft 12a. In the high gear ratio condition, the ring gear is retained against rotary movement and the gear box input shaft 14a is then driven by the steering shaft 12a through the sun gear 32 and the planet gears 36.

To obtain the low gear ratio condition, a clutch unit 40 is provided. As has already been mentioned, the clutch housing 39 provides support for the planet gear shafts 34. Longitudinally extending keyways 12c and 39a are provided respectively in the exterior surface of steering shaft 12a and the interior wall surface of clutch housing 39. A stack of annular clutch plates 42 are then disposed between clutch housing 39 and shaft 12a in conventional manner, alternate plates 42 having internal key portions 42a engaging in shaft keyway 12c and the remaining plates 42 having external key portions 42b engaging in housing keyway 39a. An annular compression plate 44 is mounted adjacent the end face of the stack of clutch plates and a plurality of circumferentially spaced springs 46 are provided to normally maintain the clutch plates 42 in frictional engagement. Springs 46 operate between the outer end face of pressure plate 44 and the inner surface of an annular spring mounting plate 48. Bolt-like spring guides 46a are preferably provided, having their shank portions respectively pressed into suitable apertures in the pressure plate 44 and support plate 48 to position them in opposed alignment. Support plate 48 is in turn backed up by a lock ring 49 secured to steering shaft 12a. Clutch unit 40 is substantially enclosed by a clutch housing member 50. Clutch housing member 50 is of cup-shaped configuration having a bearing 50b in its central hub portion journaling such housing on the shaft 12a. The end face of the annular side wall of outer clutch housing 50 abuts an axially projecting flange portion 38d of ring gear housing 38 and is rigidly secured thereto by suitable bolts 50c. Hence the outer clutch housing 50 is co-rotatable with the ring gear 38c.

From the foregoing description, it is apparent that the clutch element 40 is normally maintained in an engaged position by the springs 46 and hence the planet gears 36, ring gear 38c, and sun gear 32 are all normally locked together for co-rotation, thereby providing positive direct coupling of steering shaft 12a to gear box input shaft 14a.

The clutch unit 40 may be actuated to a disengaged or uncoupled position by axial movement of the pressure plate 44 to the left as viewed in Figure 1, against the bias of springs 46. To accomplish such axial movement, an annular operating member 52 is provided which is disposed between the interior walls of outer clutch housing 50 and the exterior walls of inner clutch housing 39. An integral, inwardly projecting radial flange portion 52a of operating member 52 transmits axially directed forces from a plurality of axially movable plungers 54. The plungers 54 are axially slidably mounted in ring gear housing 38, and, as will be described later, are utilized to transmit an axially directed force to the pressure plate 44 of the clutch unit 40 to actuate such clutch unit to a disengaged or uncoupled position. To reduce friction between the operating member 52 and the abutting ends of plungers 54, an annular thrust bearing 52b is provided therebetween.

To obtain the high gear ratio condition between steering shaft 12a and gear box input shaft 14a, a brake or coupling unit 60 is employed. A housing member 62 is provided for brake unit 60 having an axially projecting flange portion 62a surrounding a portion of the periphery of ring gear housing 38 and keyed thereto as by having internally projecting ribs 62b engaging in external key slots 38d (Figs. 2–4). Ribs 62b are smaller than key slots 38d to permit a limited degree of rotation of ring gear housing 38 with respect to brake housing 62. Such housing 62 is further provided with a central bearing hub portion 62c which is suitably journaled on the periphery of shaft 14a by a bearing 63. Brake housing 62 also defines an annular, axially projecting brake support flange 62d which is provided with a plurality of peripherally spaced longitudinal keyways 62e in its interior surface. Hub portion 10g is provided with longitudinal keyways 13 and hence a plurality of annular brake disks 64 may be mounted between hub 10g and support flange 62d and alternate plates secured respectively to such elements by virtue of engagement of integral key tabs 64a and 64b respectively with keyways 62e and 13. An annular pressure plate 66 is provided surrounding the hub 10g and arranged to abut the end face of the stack of disks 64 to apply an axial pressure thereto to effect the coupling or engagement of the brake disks. Pressure plate 66 is secured in axially spaced relationship to an annular operating member 68 by a plurality of bolts 68a and surrounding springs 68b. The normal axial position of operating member 68 is such as to maintain pressure plate 66 out of engagement with brake disk 64 as shown in Figure 1, so that the brake unit 60 is normally in an uncoupled or disengaged position. Brake unit 60 may, however, be placed in a coupled or engaged position by an axial shifting of the operating member 68 toward the left as viewed in Figures 1 and 14.

In accordance with this invention, the shifting of operating member 68 to effect the coupling of brake unit 60 is manually controlled, such as by the provision of a shifting mechanism 70. As shown in Figures 6 through 8, shifting mechanism 70 comprises an annular plate 70a (Figure 6), journalled on hub 10g, which is suitably recessed to mount a plurality of ball elements 70b for rotation about circumferentially spaced, radial axes. Plate 70a is also provided with an integral radially projecting fork portion 70c which, as will be later described, receives an operating part from a manually controlled linkage. A cam plate 70d (Figure 7) is provided which comprises an annular member mounted on hub 10g immediately adjacent to ball carrying plate 70a and having a plurality of recesses 70e in its end face in which the ball elements 70b are normally received. Cam plate 70d is rigidly secured to operating member 68 as by bolts 70f.

When the shifting mechanism 70 is assembled within the casing 10, the balls 70b of the ball carrying plate 70a abuts against a washer 11, which in turn abuts against radial end wall 10m of the casing 10. When the balls 70b are in engagement in recesses 70e of stationary plate 70d, there is sufficient axial play in the assembly so that no axial force is imparted to the plates 64 of the brake unit 60. When the ball carrying plate 70a, however, is rotated so as to move the balls 70b out of recesses 70e in the cam plate 70d, an axial shifting of the entire assemblage is produced sufficient to force the pressure plate 66 against the brake disks 64 to effect the frictional coupling of such disks. Therefore, the ring gear 38c is, in effect, coupled to a stationary member of the assemblage which is the internally projecting hub portion 10g of housing part 10b.

Rotational shifting of ball carrying plate 70a of the shifting mechanism 70 may be manually accomplished in any convenient manner, such as by a crank 72 which is journaled in the end wall of housing part 10b and has as offset arm 72a carrying a roller 72b which is engaged in the opening between the fork-like projections 70c of the ball carrying plate 70a. The shaft portion 72c of crank 72 which projects exteriorly of housing 10 has a crank arm 74 secured thereto which, as best shown in Figure 11, is in turn connected through a linkage 76 to a manual control cable 78. As will be understood by those skilled in the art, control cable 78 may conveniently extend to a manual operating knob (not shown) on the dash board or other convenient location in the vehicle.

From the foregoing description it is obvious that the actuation of the brake unit 60 to coupled position must be concurrently accompanied by actuation of clutch unit 40 to uncoupled condition in order to effectively change the gear ratio of the steering assembly from low to a high gear ratio condition. Such concurrent operation of the units 60 and 40 is accomplished in accordance with this invention by the cooperation of a cam plate 80 carried by brake housing 62 with cam follower rollers 54a journaled in bifurcated arms 54b of the plungers 54. Cam plate 80 is an annular member which is mounted within the axially projecting flange portion 62a of brake housing 62. Cam plate 80 is corotatable with brake housing 62 by virtue of the engagement of housing ribs 62b in key slots 80a (Fig. 3) provided on the periphery of the cam plate. The face of cam plate 80 disposed adjacent the plungers 54 is provided with a plurality of spaced cam tracks 80c of varying axial displacement. Such cam track may conveniently comprise a V-shaped indentation in such face of cam plate 80. In any event, the cam track 80c is so shaped as to produce an axial displacement of the follower rollers 54a when ring gear housing 38 rotates in either direction relative to cam plate 80, hence relative to brake housing 62.

In the low gear ratio condition of the mechanism, the brake unit 40 is coupled while the clutch unit 60 is uncoupled, hence the brake housing 62 is rotated with the ring gear housing 38 by virtue of a driving connection provided by the engagement of the cam follower rollers 54a in the cam track recesses 80c. Upon the actuation of brake unit 60 to its coupled condition, the cam plate 80 is immediately retarded, if rotating, or, if stationary, is locked in a stationary position along with the brake housing 62. Hence when the steering shaft 12a is rotated, the ring gear housing 38 will rotate relative to the cam plate 80 and the resulting movement will force the plungers 54 axially toward the left as viewed in Figures 1 and 14 and effect the immediate uncoupling of clutch unit 40.

As was previously mentioned, the key-like ribs 62b provided on the brake housing 62 are of substantially smaller peripheral extent than the ring gear housing key slots 38d (Figure 4). Hence the ring gear housing 38 is permitted to rotate with respect to brake housing 62 and cam plate 80 a sufficient angular distance to insure the axial displacement of the plungers 54 to operate clutch unit 40 to its uncoupled position.

With the mechanism thus far described, the steering assembly would not remain continuously in the high gear ratio condition inasmuch as a reversal in direction of steering would cause the cam follower rollers 54a to retrace their paths on cam plate 80, returning to the deep portion of the cam track recesses 80c and then ride up the side walls of such recesses in the opposite direction. This, of course, effects first a coupling and then uncoupling of clutch 40. Such condition would be very undesirable for it would mean that at least a small portion of the time both units 40 and 60 would be coupled and hence the turning effort required would be so great as to be impractical.

To lock the variable ratio mechanism in the high gear ratio condition, a plurality of locking elements 90 are provided. As shown in Figure 3, locking elements 90 are of segmental annular configuration and are rigidly secured to cam plate 80 but axially spaced therefrom by spring elements 92. The end faces of the locking elements 90 are thus positioned closely adjacent to the end wall of ring gear housing 38 and the opposed surfaces of these members are provided with serrations 90a and 38f respectively which are mutually interengageable when the cam plate 80 is axially advanced toward the ring gear housing 38.

Figure 12:
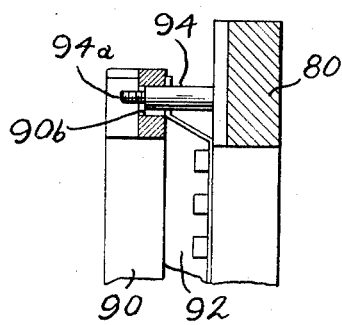
Figures 12 and 13 are enlarged scale, partial sectional views, illustrating the method of assembling and preloading of the locking plate and its spring support.
Figure 13:
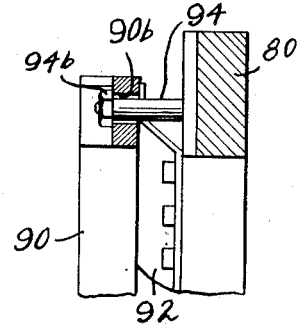

As best shown in Figures 12 and 13, the spring elements 92 accomplish the additional function of permitting a highly accurate adjustment of the axial position of the locking elements 90 to be obtained. A plurality of studs 94 are suitably secured in the end face of the cam plate 80 and the threaded end 94a of each such stud projects through a suitable aperture 90b provided in the adjacent locking element 90. The spring 92 is of a leaf type, having a generally S-shaped cross section, and opposite ends of the spring are respectively rigidly secured to the opposed faces of cam plate 80 and locking element 90. Hence the tightening of nuts 94b on the studs 94 will not only preload the springs 92 but also permits a very accurate adjustment of the axial position of the locking element 90 with respect to the cam plate 80. As will be seen later, such adjustment permits accurate regulation of the timing of the locking engagement of the lock elements 90 with the ring gear housing 38.

The locking elements 90 are axially shifted into engagement with ring gear housing 38 in timed relationship to the operation of the units 40 and 60. A plurality of plungers 96 are suitably mounted in brake housing 62 for axially slidable movement therein and adjustable contact bolts 96a are provided in the outer ends of the plungers 96 and disposed in the path of an integral flange 68d provided on brake operating member 68. The spacing between brake operating member flange 68d and the contact bolts 96a is adjusted so that when operating member 68 is initially axially shifted, the brake unit 60 is first placed in coupling condition and there is no uncoupling of clutch unit 40 unless torque is imparted to the input shaft 12a, causing the roller 54a to climb the ramp face 80a. If no torque is applied to shaft 12a, further axial movement of member 68 shifts the plungers 96 axially, which in turn shifts cam plate 80 axially to uncouple clutch 40 and concurrently shifts the locking elements 90 axially into engagement with the adjacent serrated surface of the ring gear housing 38. Hence the clutch 40 is uncoupled and ring gear housing 38 is rigidly locked to the clutch housing 62 and therefore maintained stationary whether or not torque is applied to shaft 12a so long as the manual control linkage maintains the shifter elements 70 in their axially expanded position. With the ring gear 38c stationary, a high gear ratio transmission is established between steering shaft 12a and gear box input shaft 14a and such high gear ratio connection is maintained independently of the direction of rotation of steering shaft 12a.

To restore the low gear ratio transmission between steering shaft 12a and gear box input shaft 14a, the manual control linkage is manipulated to operate the shifter mechanism 70 to its axially retracted position. During the initial return movement of brake plate 68, brake 60 remains coupled but the clutch springs 46 and the spring elements 92 axially retract cam plate 80 and plungers 96. Thereupon the locking elements 90 are axially shifted out of engagement with ring gear housing 38. The axial force exerted by clutch springs 46 forces cam follower rollers 54a to ride into the deep portions of the cam tracks 80c, shifts cam plate 80 and thereby releases the uncoupling axial pressure on pressure plate 44, whereupon clutch unit 40 returns to its coupled condition under the bias of springs 46. Thereafter, clutch springs 68b effect the uncoupling of brake 60. Hence on the return to the low gear ratio condition, the clutch 40 is engaged before the release of brake 60.

However, even in the brief period when both clutch 40 and brake 60 are coupled during the gear changing operation, the application of torque to steering shaft 12a will uncouple clutch 40 by rollers 54a riding up ramp surfaces 80c. Hence, steering may be effected during this period and locking of the wheels never occurs.

It should be particularly noted that in addition to its functional advantages, the described construction permits all of the elements of the variable ratio steering assembly to be completely enclosed and to be lubricated by operation in a bath of oil. Suitable seals indicated at 98 are provided to prevent leakage of oil to the exterior of casing 10 or into the hollow bores of steering shaft 12a or gear box input shaft 14a. Long life, as well as ease and reliability of operation, is thereby assured.

The described construction not only permits convenient manual selection of the effective gear ratio of the steering assembly but also insures that, under all conditions, a positive drive exists between the steering shaft 12a and the dirigible wheels 26 of the vehicle. There is therefore no opportunity, or combination of operating circumstances, under which the steerable wheels of the vehicle are not under the control of the steering shaft.

It will, of course, be understood that various details of construction may be modified through a wide range without departing from the principles of this invention and it is, therefore, not the purpose to limit the patent granted hereon otherwises than necessitated by the scope of the appended claims.

I claim as my invention:

1. A variable gear ratio steering assembly comprising a steering shaft, a steering linkage, a sun gear positively connected to and driven by said shaft, a spider positively connected to and driving said steering linkage, planet gears rotatably mounted on said spider and meshed with said sun gear, a ring gear meshed with said planet gears, a first means operable to connect said spider to rotate with said sun gear and effect turning of said steering linkage at the speed of said steering shaft when said steering shaft is turned in either direction, a second means operable to prevent rotation of said ring gear and cause said planet gear and spider to rotate relative to said ring gear and effect turning of said steering linkage at a reduced speed upon turning of said steering shaft in either direction, and selectively operable means interconnecting said first and second means for operating only said first means or only said second means at any one time, whereby a positive driving connection is always maintained between said steering shaft and said steering linkage while the gear ratio therebetween is selectively changeable.

2. In a dirigible vehicle having a steering shaft and a steering linkage, the improvements of a housing surrounding the end of said steering shaft, an input shaft for said steering linkage projecting into said housing coaxially with said steering shaft, a sun gear positively connected to and driven by said steering shaft, a spider positively connected to and driving said input shaft, planet gears rotatably mounted on said spider and meshed with said sun gear, a ring gear meshed with said planet gears, a first means operable to connect said spider to rotate with said sun gear, a second means operable to prevent rotation of said ring gear, and selectively operable means interconnecting said first and second means for operating only said first means or only said second means at any one time, whereby a positive driving connection is always maintained between said steering shaft and said steering linkage during either direction of rotation of said steering shaft while the gear ratio therebetween is selectively changeable.

3. A steering assembly for dirigible vehicles comprising a steering shaft, a steering linkage having a rotating input member, a planetary transmission connecting said steering shaft and said input member, a clutch operatively connected between said steering shaft and said input member, resilient means urging said clutch to an engaged position to normally maintain said steering shaft and said input member directly coupled, a brake operatively disposed between a stationary member and one of the gear elements of said planetary transmission, a control lever for selectively engaging and disengaging said brake, and means interconnecting said clutch and brake for shifting said clutch to a disengaged position only when said brake is engaged including means operable by torsional movement of said steering shaft when said brake is engaged, to release said clutch, whereby a driving connection is always maintained between said steering shaft and said linkage and the gear ratio therebetween is changeable by manipulation of said control lever.

4. A variable gear ratio steering assembly comprising a steering shaft, a steering linkage, a sun gear positively connected to and driven by said shaft, a spider positively connected to and driving said steering linkage, planet gears rotatably mounted on said spider and meshed with said sun gear, a ring gear meshed with said planet gears, a clutch operatively connected between said spider and said steering shaft, resilient means urging said clutch to an engaged position to normally maintain said steering shaft and said spider directly coupled, a brake operatively disposed between a stationary member and said ring gear, a control lever for selectively engaging and disengaging said brake, and means interconnecting said clutch and brake for shifting said clutch to a disengaged position only when said brake is engaged including means operable by turning of said steering shaft to release said clutch upon the application of said brake, whereby a driving connection is always maintained between said steering shaft and said steering linkage and the gear ratio therebetween is changeable by manipulation of said control lever.

5. A steering assembly for dirigible vehicles comprising a steering shaft, a steering linkage having a rotating input member, a planetary transmission connecting said steering shaft and said input member during either direction of rotation of said steering shaft, a clutch operatively connected between said steering shaft and said input member, said clutch including an axially shiftable operating member, resilient means urging said operating member to a clutch engaged position to normally maintain said steering shaft and said input member directly coupled, a stationary member, a brake operatively disposed between said stationary member and one of the gear elements of said planetary transmission, said brake also having an axially shiftable operating member, resilient means normally urging said last mentioned operating member to a brake released position, a control lever for selectively shifting said last mentioned operating member to a brake engaging position, and means operable by the braking effect of said brake on said gear element for shifting said first mentioned operating member to disengage said clutch.

6. A variable ratio steering transmission comprising a steering shaft, a sun gear on said shaft, a spider carrying planet gears meshed with said sun gear, clutch means normally coupling said spider and said steering shaft, a shiftable control member for disengaging said clutch means, a ring gear meshed with said planet gears, a rotatable plate defining a cam track, a cam follower shiftably mounted in said ring gear, said cam follower having one portion normally engaging said cam track and another portion operatively connected to said shiftable clutch control member, and means for selectively braking the rotation of said ring gear, thereby producing a displacement of said cam follower to disengage said clutch means and vary the gear ratio between said steering shaft and said spider.

7. A variable gear ratio steering assembly comprising a driving shaft, a driven shaft, a planetary transmission interconnecting said shafts including a sun gear connected with one of said shafts, spider supported planet gears meshing with said sun gear and connected with the other of said shafts, and a ring gear meshing with said planet gears, means for releasably coupling said sun gear and said planet gear spider for co-rotation, including an axially shiftable operating member spring-urged to its coupled position, whereby said driving and driven shafts are normally coupled for co-rotation, a stationary housing surrounding said transmission, a cam plate rotatably mounted adjacent said ring gear, axially varying cam surfaces on said cam plate, axially shiftable plungers mounted in said ring gear having one end thereof respectively abutting said cam surfaces and the other end operatively connected to said operating member, whereby said cam plate normally rotates with said ring gear and exerts no effect on said operating member, a brake operatively connected between said cam plate and said stationary housing, manually operable means for selectively actuating said brake to couple said cam plate to said housing, whereby said ring gear rotates relative to said cam plate to shift said plungers to move said operating member to its uncoupled position, and means for locking said cam plate to said ring gear subsequent to the aforesaid shifting of said plungers.

8. A variable gear ratio steering assembly comprising a driving shaft, a driven shaft, a planetary transmission interconnecting said shafts including a sun gear connected with one of said shafts, spider supported planet gears meshing with said sun gear and connected with the other of said shafts, and a ring gear meshing with said planet gears, means for releasably coupling said sun gear and said planet gear spider for co-rotation, including an axially shiftable operating member spring-urged to its coupled position, whereby said driving and driven shafts are normally coupled for co-rotation, a stationary housing surrounding said transmission, a cam plate rotatably mounted adjacent said ring gear, axially varying cam surfaces on said cam plate, axially shiftable plungers mounted in said ring gear having one end thereof respectively abutting said cam surfaces and the other end operatively connected to said operating member, whereby said cam plate normally rotates with said ring gear and exerts no effect on said operating member, a brake operatively connected between said cam plate and said stationary housing, manually operable means for selectively actuating said brake to couple said cam plate to said housing, whereby said ring gear rotates relative to said cam plate to shift said plungers to move said operating member to its uncoupled position, a serrated surface on said ring gear, a serrated locking member secured to said cam plate and disposed adjacent said ring gear, and means for moving said locking member into engagement with said ring gear serrated surface subsequent to the aforesaid shifting of said plungers, thereby locking said ring gear to said cam plate.

9. A variable gear ratio steering device comprising a driving steering member, a driven steering member, a selectively operable plural speed reduction gearing connecting said driving steering member with said driven steering member and providing a reversely operable high and low gear reduction between said driving and driven members, clutch means locking the assembly in high gear, brake means locking the assembly in low gear, and means interconnected between said clutch and brake means for operating said clutch and said brake means to release one and then engage the other without ever simultaneously releasing both when changing from low to high gear and from high to low gear.

10. In a variable ratio steering transmission, a driving shaft, a coaxial driven shaft, a sun gear connected with one of said shafts, a spider connected with the other of said shafts, a planetary gear carried by said spider and meshing with said sun gear, a ring gear meshing with said planetary gear, a clutch connecting said shafts to turn together at the same speeds, spring means for engaging said clutch, a brake adapted to hold said ring gear from rotation, a plate having a cam track thereon, a follower engaging said cam track and having operative connection with said clutch to disengage said clutch upon the application of said brake and upon relative movement of said driving shaft with respect to said plate, and means selectively operable to apply said brake and axially move said plate in a direction to disengage said clutch regardless of relative movement between said driving shaft and plate.

11. In a variable ratio steering transmission, a driving shaft, a coaxial driven shaft, a sun gear connected with one of said shafts, a spider connected with the other of said shafts, a planetary gear carried by said spider and meshing with said sun gear, a ring gear meshing with said planetary gear, a clutch connecting said spider to rotate with said driving shaft, spring means for engaging said clutch, a brake for holding said ring gear from rotation, a plate having a cam track on one face thereof, a cam follower engaging said cam track and having operative connection with said clutch to disengage said clutch upon the application of said brake and upon relative movement of said driving shaft with respect to said plate, means selectively operable to apply said brake and axially move said plate in a direction to disengage said clutch, and other means moving with said plate for engagement with said ring gear, to hold said ring gear from rotation and prevent turning of said ring gear upon torsional movement of said driving shaft in a direction to move said follower off said cam track.

12. In a variable ratio steering transmission, a driving shaft, a coaxial driven shaft, a sun gear connected with said driving shaft, a spider connected with said driven shaft, a planetary gear carried by said spider and meshing with said sun gear, a ring gear meshing with said planetary gear, a clutch connecting said spider to rotate with said driving shaft, spring means for engaging said clutch, a brake for holding said ring gear from rotation, to effect driving of said driven shaft at a reduced speed, a plate having a cam track thereon, a cam follower operatively connected with said clutch and engaging said cam track to disengage said clutch upon the application of said brake and upon relative movement of said driving shaft with respect to said plate, means selectively operable to apply said brake and to axially move said plate in a direction to disengage said clutch, a locking member held from rotation by said brake, yieldable means connecting said locking member to said plate for axial movement therewith, said locking member having a portion engageable with said ring gear in locking engagement therewith upon movement of said plate toward said ring gear, to hold said ring gear from rotation upon the application of said brake but prior to axial movement of said plate a distance sufficient to positively disengage said clutch and to prevent disengagement of said clutch upon turning of said driving shaft in a direction to move said follower off the cam surface on said plate.

13. In a variable gear ratio steering assembly, a driving shaft, a driven shaft, a sun gear on one of said shafts, a spider connected with the other of said shafts, a planetary gear carried by said spider and meshing with said sun gear, and a ring gear meshing with said planetary gear, clutch means selectively operable to connect said ring gear to rotate with said driving shaft and provide a direct drive connection between said driving and driven shafts, brake means selectively operable to hold said ring gear from rotation upon release of said clutch means, to provide a reduced drive connection to said driven shaft through said planetary gear, means operable to apply said brake means, other means operable to release said clutch means after the application of said brake means and upon relative movement of said driving shaft with respect to said brake means in one direction, and means to prevent the engagement of said clutch means upon the initial application of said brake means and the turning of said drive shaft in a direction reverse to that required to release said clutch means, including a member held from rotational movement by said brake means and movable into engagement with said ring gear.

14. In a variable gear ratio steering assembly, a driving shaft, a driven shaft, a sun gear on one of said shafts, a spider connected with the other of said shafts, a planetary gear carried by said spider and meshing with said sun gear, and a ring gear meshing with said planetary gear, clutch means selectively operable to rotate said ring gear with said driving shaft and to provide a direct drive connection between said driving and driven shafts, brake means selectively operable to hold said ring gear from rotation upon release of said clutch means and to provide a reduced drive connection to said driven shaft through said planetary gear, means operable to apply or release said brake means, a cam plate operable to release said clutch means after the application of said brake means and upon relative movement of said driving shaft with respect to said brake means in one direction, and means operable to prevent the engagement of said clutch means upon the application of said brake means and the turning of said drive shaft in a direction reverse to that required to release said clutch means including a locking member held from rotation by said brake means and movable into engagement with said ring gear, to positively hold said ring gear from rotation with respect to said brake means.

15. In a variable gear ratio steering assembly, a driving shaft, a driven shaft, a sun gear on one of said shafts, a spider connected with the other of said shafts, a planetary gear carried by said spider and meshing with said sun gear, and a ring gear meshing with said planetary gear, clutch means selectively operable to lock said sun, planetary and ring gears to rotate together and rotate said ring gear with said driving shaft and drive said driven shaft at the speed of the driving shaft, brake means selectively operable to hold said ring gear from rotation upon release of said clutch means and to provide a reduced drive connection to said driven shaft through said planetary gear, means operable to apply or release said brake means, a cam plate means engageable with said cam plate and operatively connected with said clutch to release said clutch means after the application of said brake means and upon relative movement of said driving shaft with respect to said brake means, and means operable to prevent the engagement of said clutch means upon the application of said brake means and the turning of said drive shaft in a direction reverse to that required to release said clutch means including a locking member, yieldable means connecting said locking member to said cam plate, to move into locking engagement with said ring gear upon axial movement of said cam plate toward said ring gear.

JAMES H. BOOTH.

REFERENCES CITED

The following references are of record in the file of this patent:

UNITED STATES PATENTS

| Number | Name | Date |
| --- | --- | --- |
| 640,830 | Swayze | Jan. 9, 1900 |
| 940,095 | Walser | Nov. 16, 1909 |
| 1,619,701 | Chorlton | Mar. 1, 1927 |
| 1,909,330 | Banker | May 16, 1933 |
| 2,162,071 | Eason | June 13, 1939 |
| 2,209,120 | Hoffman | July 23, 1940 |